(12) United States Patent
Tiegel et al.

(10) Patent No.: US 6,851,988 B2
(45) Date of Patent: Feb. 8, 2005

(54) APPARATUS AND METHOD FOR FORMING BATTERY TERMINAL POSTS

(75) Inventors: Ralph G. Tiegel, Redwood City, CA (US); Paul Wegner, San Carlos, CA (US)

(73) Assignee: Tiegel Manufacturing Company, Belmont, CA (US)

( * ) Notice: Subject to any disclaimer, the term of this patent is extended or adjusted under 35 U.S.C. 154(b) by 110 days.

(21) Appl. No.: 10/429,073

(22) Filed: May 2, 2003

(65) Prior Publication Data

US 2003/0209339 A1 Nov. 13, 2003

Related U.S. Application Data

(60) Provisional application No. 60/377,867, filed on May 7, 2002.

(51) Int. Cl.[7] .......................... H01R 4/28; B22D 27/04; B22D 17/04; H01M 2/04
(52) U.S. Cl. ........................ 439/754; 219/81; 29/623.2; 164/312
(58) Field of Search ............................ 439/754; 219/81, 219/137 R; 29/623.2; 164/312, 271

(56) References Cited

U.S. PATENT DOCUMENTS

| | | | |
|---|---|---|---|
| 3,718,174 A | * 2/1973 | Hull et al. | 164/155.6 |
| 3,802,488 A | * 4/1974 | Hull et al. | 164/270.1 |
| 3,806,696 A | * 4/1974 | Young et al. | 219/137 R |
| 4,108,417 A | * 8/1978 | Simonton et al. | 249/81 |
| 4,241,151 A | * 12/1980 | Uba | 429/94 |
| 6,059,848 A | * 5/2000 | Shannon et al. | 29/623.2 |
| 6,513,570 B2 | * 2/2003 | Ratte | 164/312 |

* cited by examiner

Primary Examiner—Chandrika Prasad
(74) Attorney, Agent, or Firm—Frank J. Benasutti

(57) ABSTRACT

In a battery post burning apparatus, the majority of the heat is supplied to the lead via the mold in which the finished post is being formed. The mold material in contact with the lead has a low thermal mass and high electrical and thermal resistance.

The mold material may be Meehanite cast iron. Another material, such as titanium, may be used. If so, it is preferable to coat it with silver solder and provide a copper insert, where the electrical and thermal connection is being made.

In another embodiment, a magnetic field is provided to break up any oxide coatings on the mold surfaces.

15 Claims, 5 Drawing Sheets

APPARATUS AND METHOD FOR FORMING BATTERY TERMINAL POSTS

CROSS-REFERENCE TO RELATED APPLICATION

This application claims the benefit of our prior U.S. Provisional Patent Application No. 60/377,867 filed May 7, 2002 which application is incorporated herein by reference as if fully set forth.

BACKGROUND OF THE INVENTION

1. Field of the Invention

This invention relates to the formation of battery terminal posts, and, more particularly, to improvements in the method and apparatus for forming low and high profile battery terminal posts in situ.

2. Description of the Art

The present invention deals with low and high profile battery terminal posts. Additional lead has to be added to terminal posts that are pre-formed on the battery group strap. The terminal post is positioned up through a bushing on the cover of the battery.

In the prior art, it is known to form battery terminal posts by lowering a mold over a bushing embedded in the battery cover through which a portion of an unfinished terminal post is projecting from the battery terminal group strap positioned inside the battery, and then heating the terminal posts and applying additional lead so as to fill the mold and join the additional lead with the unfinished portion of the post, and then cooling the lead to form the post.

In the prior art, there is no practical way to build up the lead from the bottom to the top within the mold. Various ways have been tried. One way is to use a torch and go around in an orbital fashion between the terminal post and the bushing. However, as soon as the hot lead begins to run down into the mold, it freezes or solidifies preventing the torch from heating any further down in the mold.

Another way is to push a hot rod down into the terminal post and, as the lead melts, continue to push the hot rod down. This is much like an old fashion pre-heated soldering iron.

Typically, the prior art teaches the use of molds which have a thermal mass that is much higher than the thermal mass of the material being cast.

The method of heating is also important. Heating the mold itself or from the outside are the two preferred methods. Attempting to heat the mold from the inside by flame, introduction of very hot lead, or a hot poker (i.e. soldering iron) is slow and complicated. It is also very difficult to place the heat where one prefers to apply it; which is near the base of the mold. In order to use prior art methods, one needs to heat more of the lead post. This causes the lead to shrink during cooling. In order to obtain a terminal of proper appearance, the lead has to be remelted.

Various problems have been noted in the prior art. As a result, in accordance with our invention, it is an object to solve these problems by placing the heat exactly where it is needed; rapidly heating and cooling the post; breaking up oxide coating by vibration or pumping the liquid lead; and making it easy to repair battery terminals by remelting the terminals.

Another desirable object is providing durability over several heat and cooling cycles.

Other objects and advantages of the invention will become more apparent from the following description with reference to the accompanying drawings.

DISCLOSURE OF THE INVENTION

SUMMARY OF THE INVENTION

In accordance with our invention, the majority of the heat is supplied to the lead via the mold. The mold material in contact with the lead has a low thermal mass and high electrical and thermal resistance. It is also desirable to melt some of the lead to provide good thermal contact between the mold and the post. This allows for faster heat transfer and lower mold temperatures.

The preferred mold material is Meehanite cast iron. If another material, such as titanium is used, it is preferable to coat it with silver solder and provide a copper insert, where the electrical and thermal connection is being made. The silver solder/copper connection between the mold and the current source ensures better electrical and thermal transfer.

In another embodiment, a magnetic field is provided to break up any oxide coatings on the mold surfaces.

DESCRIPTION OF THE PREFERRED EMBODIMENTS

Figure 2:
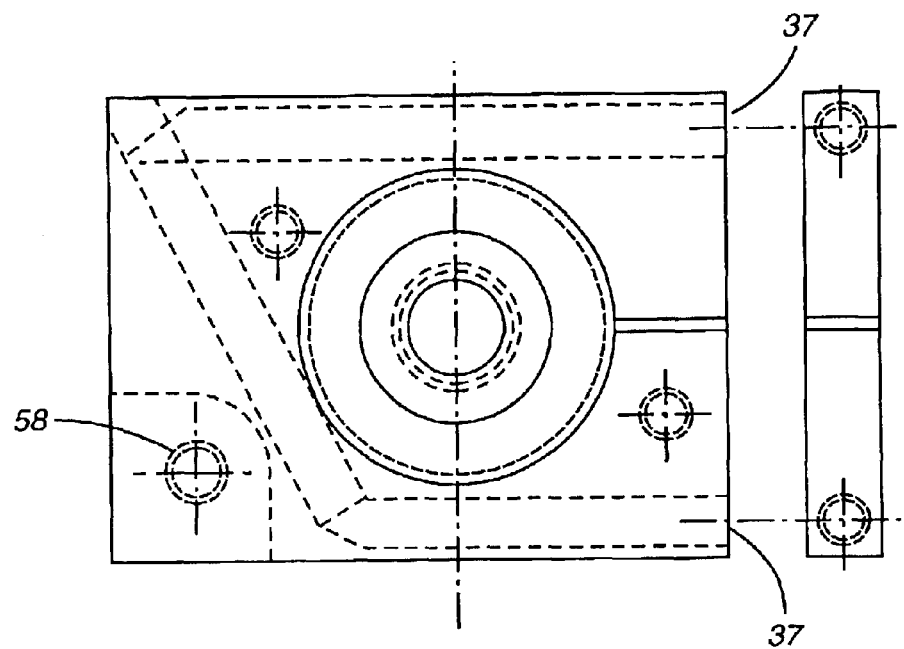
FIG. 2 is a top view of an apparatus shown in FIG. 1.

In accordance with the preferred embodiment of our new method and apparatus, the terminal post is surrounded by a Meehanite grade cast iron mold. This has the unique property of a high graphite content, thereby not being wetted by the lead. Also, the graphite acts as a lubricated surface for easy removal from the finished lead post. In addition, the Meehanite does not develop an oxide coating. Therefore, it achieves the ability to pass the current through the lead as well. A pulse of electricity of approximately two and one-half volts and 7500 amps for one and one-half seconds is passed through the mold. This heats the post throughout, melts it, and fuses it to the existing bushing in the top or cover of the battery. As a first step, the top of the terminal post is melted by a torch, so that a small portion of the lead drips down and makes initial thermal contact with the mold.

The mold is surrounded by a manifold structure through which cooling water is passed. The manifold also provides for the electrical connection to the mold. In one embodiment, a titanium mold is used, surrounded by a copper manifold; and a silver surface is fused or welded to the titanium and copper to provide better electrical contact.

The mold material in contact with the lead must have a low thermal mass similar to or preferably less than the thermal mass of the lead battery terminal. This translates into a mold of thin walls 0.2 to 0.02 inch. Thin walls minimize the amount of heat that must be applied and removed from the mold. The thin mold walls also allow faster heat transfer.

The thermal mass is a function of the heat capacity, density, and volume of the mold material. The speed of cooling is inversely proportional to the wall thickness of the mold in contact with the lead and proportional to the thermal conductivity of the material.

Examples of mold materials are:

| Material | Density lb/cu in | Heat Capacity BTU/lb F | Volume of Material cu in. | Thermal Mass BTU/F | Conductivity BTU/in hr sq. ft. F |
|---|---|---|---|---|---|
| Titanium | 0.164 | 0.139 | 0.07 | 0.0016 | 119 |
| Inconel | 0.3 | 0.106 | 0.07 | 0.0022 | 103 |
| Nickel | 0.322 | 0.105 | 0.07 | 0.0023 | 639 |
| Iron | 0.284 | 0.108 | 0.07 | 0.0021 | 523 |
| Aluminum | 0.097 | 0.215 | 0.07 | 0.00146 | 1,540 |
| Copper | 0.324 | 0.092 | 0.07 | 0.020 | 2,730 |
| Lead | 0.410 | 0.031 | 0.30 | 0.0038* | 241 |

*Thermal mass of post. All other entries are thermal mass of mold in direct contact with the post. Mold volume of material assumes 0.030" mold wall thickness.

The thermal mass of potential mold materials are similar except for copper, which has an unacceptably high thermal mass.

Aluminum has a low thermal mass and a very high thermal conductivity, but it could melt if heated to an excessively high temperature.

The best method of applying heat to the mold is by passing electric current through the mold itself and through the lead. The placement of heat is controlled by varying the wall thickness of the mold. In areas where more heat is needed, the mold wall thickness is reduced.

It is preferred that the lead at the top of the post be melted during this process by heating with a torch, hot soldering tip, or bypassing current through the lead post. The molten lead falls down into the annular space between the mold and post. This allows a much faster heat passage of electrical current passing through the lead as well.

The advantages of passing current through the mold and lead are:

1. Control over where the heat is placed;
2. Rapid heating;
3. Easy and accurate control over the rate of heating and the amount of heat applied. This is controlled by the amount of amperage applied and the amount of time current is applied; and
4. Easy reapplication of heat, thus making battery terminal repair easy.

Titanium is one preferred material as a mold material because the lead does not wet easily to it. In addition, it has a low thermal mass, high electrical resistance, low thermal coefficient of expansion, does not warp easily, has high tolerance to thermal shock and thermal cycling, and high oxidation resistance. However, in order for high current to pass through the titanium, a more conductive material such as copper, silver, or aluminum must be bounded to the titanium. If this is not done, the titanium oxidizes over time on the surface between the titanium and the source of current; and eventually cannot pass current. Vanadium rod, silver solder, or other electrically conductive materials used to bond titanium to electrical conductors can be used.

We have found using silver or silver solder filler in conjunction with tungsten inert gas to be a viable method for bonding titanium to an electrical conductor such as copper or silver.

Other methods of heating, such as flame or hot gas on the outside of the mold, also allows one to place heat in the desired areas. However, the control, speed, and ease of heat application is not as good as with our invention. As in the case of electrical heating, it is desirable to melt the top of the post to facilitate thermal contact between the mold and the post.

In addition, it is desirable to rapidly cool the molten post material once the post is properly knitted to the grommet. Cooling the electrical connections to which the mold is connected provides sufficient cooling in some cases. A blast of air or other gas rapidly cools the mold and finished part without undo thermal shock to the mold. Alternately, the mold can be cooled by water or by applying a cold solid material, such as copper, to the surface of the mold. Having a mold with thin walls and low thermal mass is desirable to achieve rapid cooling. We can cool from the bottom.

If a magnet or electromagnet is placed near the mold, such as by surrounding it with iron, the liquid lead in the post mold can be pumped in a direction perpendicular to the flow of electric current. An electromagnet is preferred because the timing and direction of the pump action can be controlled. One can even control the frequency of lead pumping; reversing direction and the strength of the pumping action. It can be brought into phase with the electric heating current. In the case of a permanent magnet, the liquid lead flows up and down 60 times a second; if the power input source is 60 Hz.

The liquid lead could be moved by the combination of the electric and magnetic field.

Figure 1:
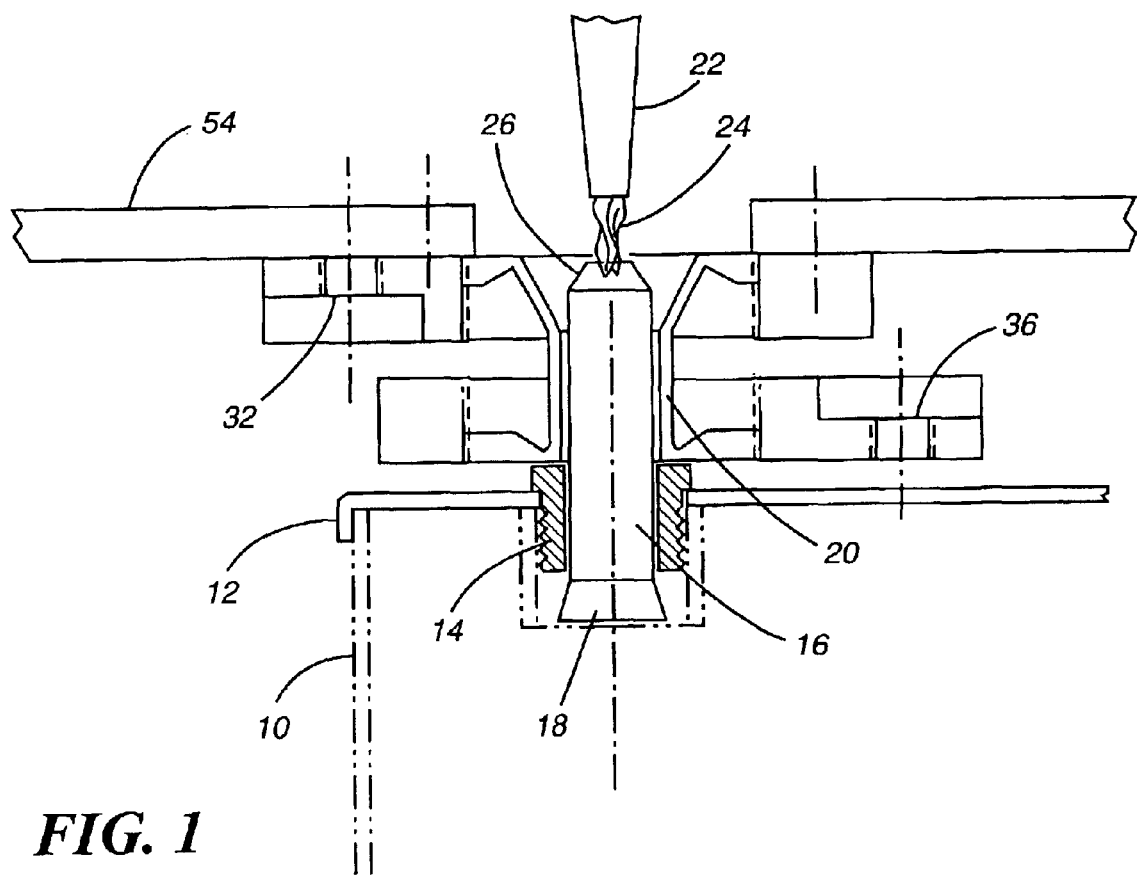
FIG. 1 shows an elevation of a post mold in accordance with our invention shown in its apparatus, partially broken away, with a battery case and cover.
Figure 4:
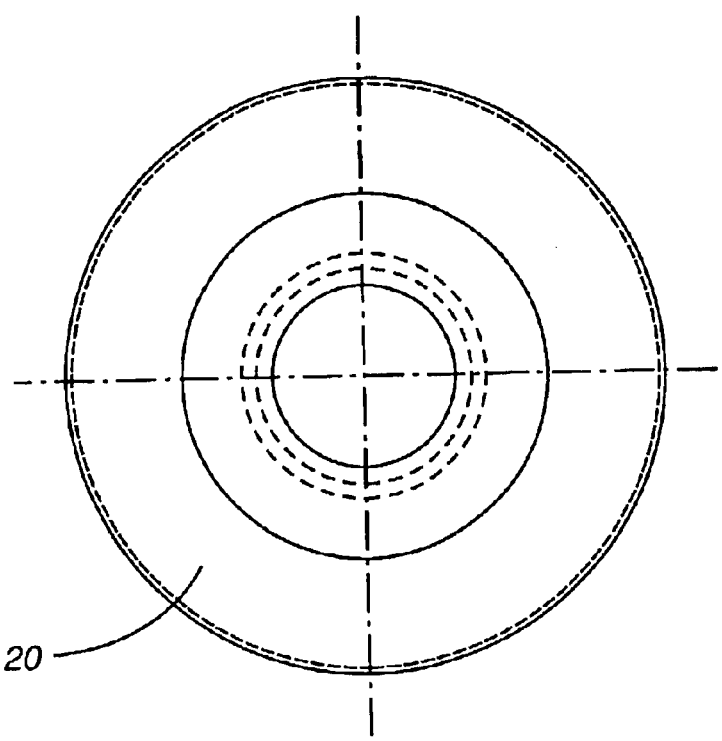
FIG. 4 is a top view of the mold shown in FIG. 3.
Figure 3:
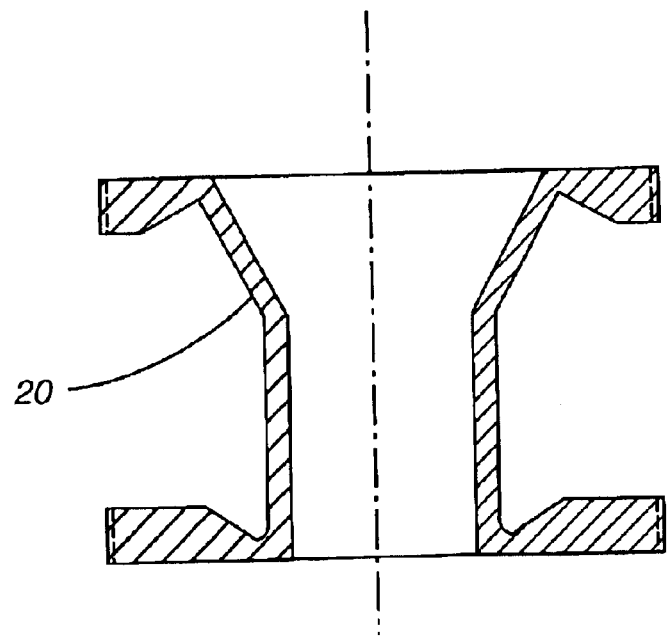
FIG. 3 is a sectional detail of a mold depicted in the apparatus shown in FIG. 1.

Referring to the Figures, FIG. 1 shows schematically an apparatus in accordance with our invention. In FIG. 1, there is shown a battery case 10, partially broken away with a cover or lid 12 in place. The lid has molded into it a lead terminal bushing 14. Rising through this terminal bushing is an unfinished lead post 16 emanating from a battery strap 18 formed on top of a battery plate group.

Mounted about the upstanding post 16 is a mold 20.

Figure 5:
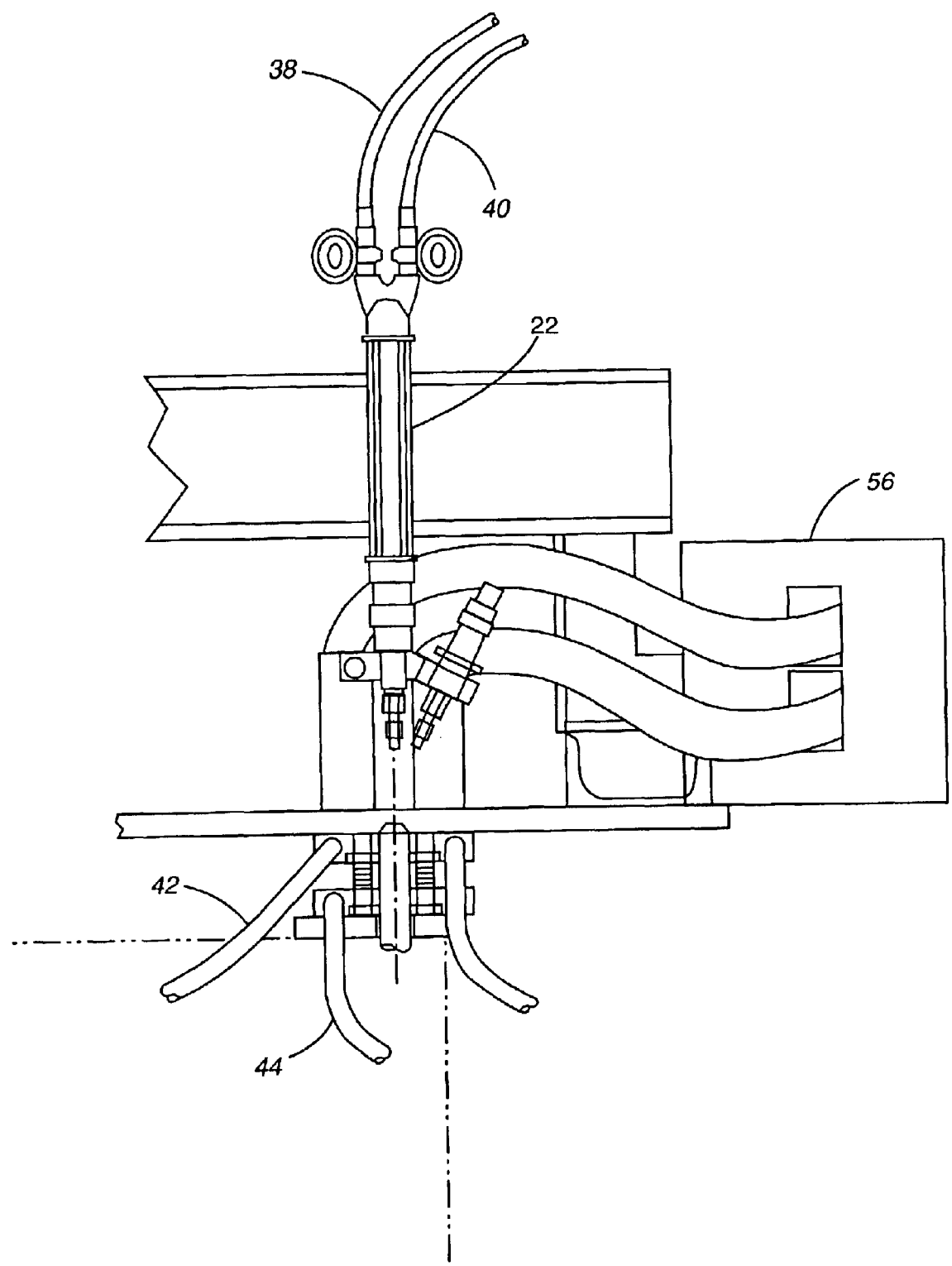
FIG. 5 is an elevation of the apparatus.
Figure 6:
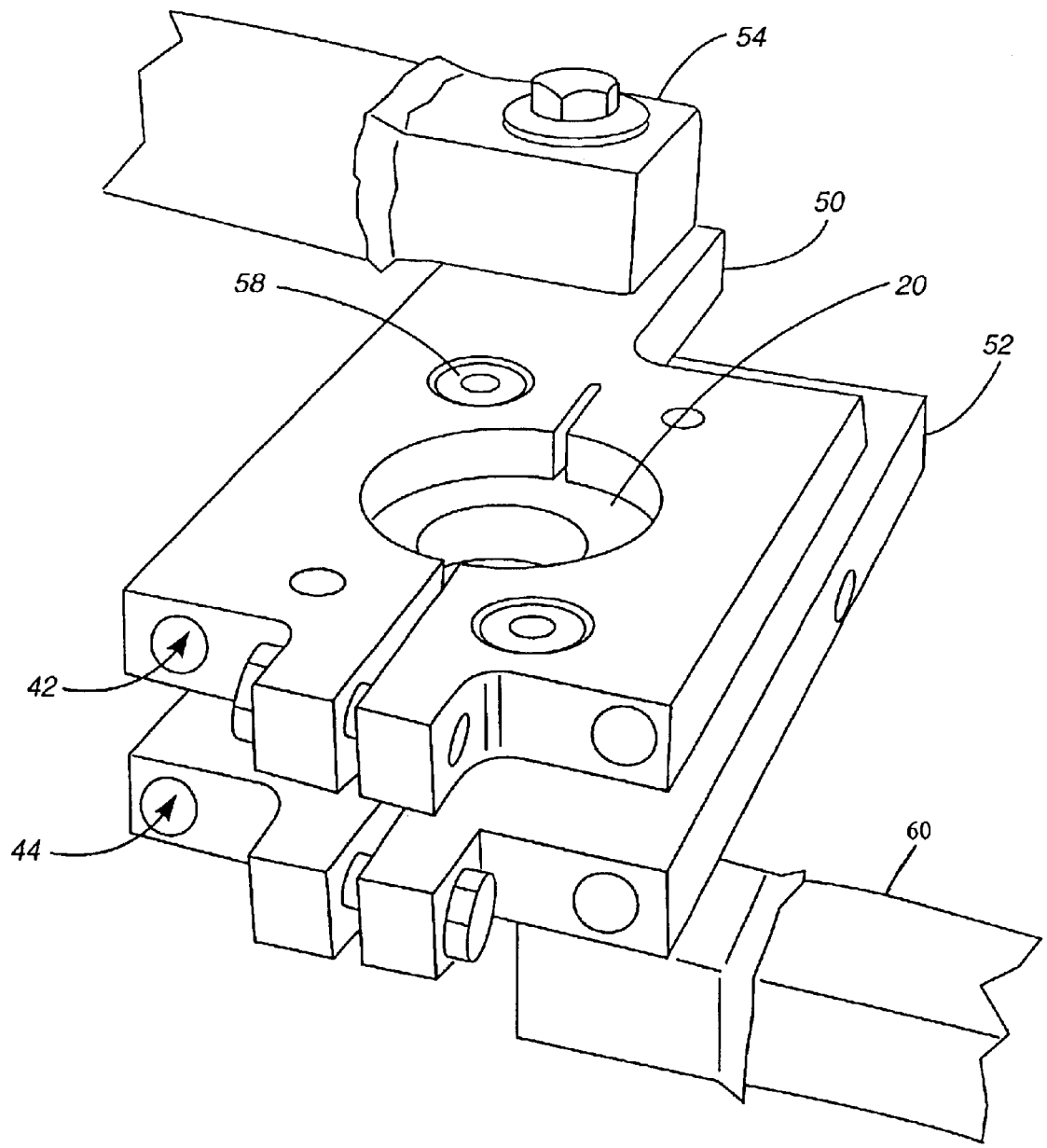
FIG. 6 is a perspective view of a portion of the apparatus.

FIG. 5 shows an elevation of the apparatus used in connection with our invention. In that apparatus, a torch 22 is mounted on a frame and has connected to it conduits for air 38 in gas 40 to support the flame of the torch. The torch is positioned so that it can apply flame to a mold mounted on top of a battery case 10. Referring to FIGS. 5 and 6, the mold 20 is retained in both upper and lower mold holders 50 and 52, respectively. The mold holders are connected electrically at 54 to a transformer 56. Since this is alternating current, an additional electric line exits at 60 from the bottom mold holder. When electricity passes through this device, it passes completely through both the mold holders and the mold.

Cooling water lines are connected to the transformers and mold holders to cool the transformer and also to cool the mold holders, such as at 42 and 44.

In accordance with the present invention, a torch 22 emits a flame 24 to melt down the lead post to form a finished battery terminal post. Heat is normally applied to the post 16 at points A and B, FIG. 8; the areas where the maximum heat needs to be applied. The finished post is shown at 30, FIG. 8.

In accordance with our invention, the mold 20 is heated by electricity. To make this electrical connection better, a titanium mold is first coated with silver; which is fused in the mold. Then copper is bonded with the silver-coated titanium mold to provide the electrical connections. Expansion joints in the copper allow for the difference in thermal expansion between the copper and titanium material. Electricity is provided to the connector at 32 and 36 and FIG. 1.

Cooling water is be supplied through the conduits 37, FIG. 2, to cool the mold.

With a transformer, we convert 440 volts at 80 amps into 2.5 volts at 7500 amps output.

Transformer cables are bolted on to the mold holder. Molder holder is clamped onto the mold.

We can get melting below 3/16 of an inch by using a hotter mold than the melting point of the lead. Then through radiation heat transfer, we are able to transfer this energy into the lead, melting it down to the base. By utilizing the mold material as a resistor, and thereby simply passing current through, we are able to achieve the higher temperature necessary for this to happen.

We utilized a torch assembly to knock down the higher cast-on post into the mold, whereupon the hot walls of the mold would then continue to melt the lead down to the bushing. By being able to pass some of the current to the lead and, since the resistance goes up by a factor of 3 between solid and liquid lead, it becomes a good vehicle for melting lead. Also, by adjusting the electrical flow, we can concentrate the heat where we want it. The higher the resistance, the more heat one can generate in the lead.

When a current passes through lead, there are some electromotive forces which cause the molten lead to swirl or jump. This assists in equalizing the temperature throughout the post. The melting point has been reduced from a little over 2000 degrees Fahrenheit to around 1300 degrees Fahrenheit for mold life.

In order to get a better knit between the terminal post and cover bushing, we use a ring protrusion at the bottom of the mold, which assists in deepening the burn while still acting as a dam to prevent washout of the bushing.

Another factor to permit a deeper burn between the post and the cover bushing is to have different alloys of lead resulting in a lower melting temperature of the post to the bushing.

Figure 7:
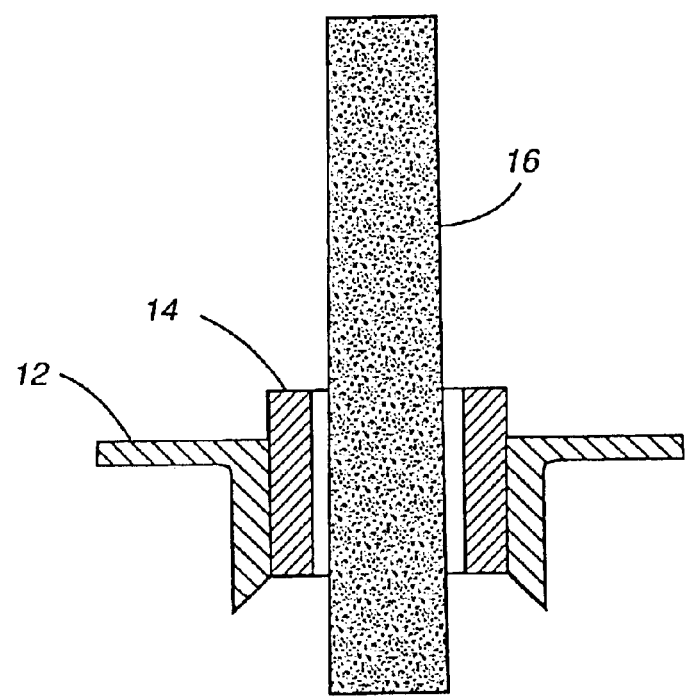
FIG. 7 is a side elevation section of an incomplete terminal post and mold.
Figure 8:
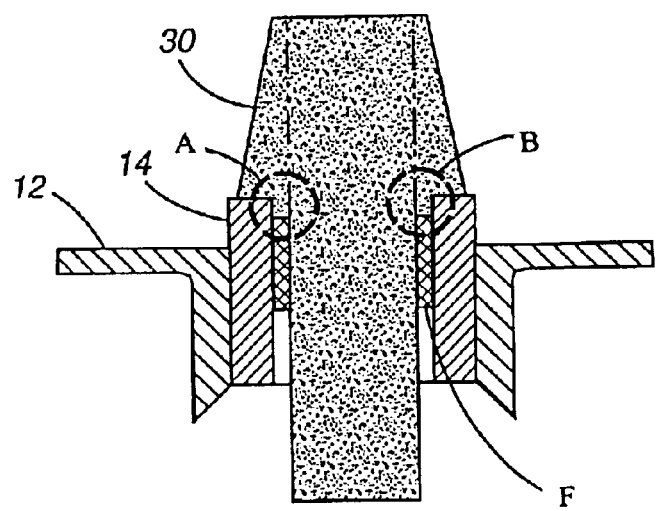
FIG. 8 is a side elevation section of a completed terminal post, bushing and battery cover.

Reference to FIGS. 7 and 8 will show the improvement of this invention over the prior art. In the prior art, the post 16 clears the bushing 14 before burning. As the burning occurs and the lead runs down into the bushing, it freezes; oftentimes before it even reaches the level of the lid 12 of the battery. However, in our invention, the melting lead continues to run down even below the lid of the battery cover 10 as shown at F in FIG. 8. In our method, heat is applied at the circles A and B, not just at the top of the post 16.

From what has been described, it will be apparent that we have invented an apparatus for use in burning the posts of a battery having a cover and a bushing in said cover through which a column of post metal protrudes, comprising: a mold surrounding the protruding column of post metal; said mold being made of a material having low thermal mass and high electrical and thermal resistance; a mold holder means for holding said mold in situ; and a source of electricity connected to said mold holder means to supply electricity thereto during burning of the posts.

We have also invented a method of forming battery posts on a battery having a cover and a bushing in said cover through which a column of post metal projects, comprising: placing a mold around said post metal; said mold being made of a material having a low thermal mass and a high electrical and thermal resistance; retaining said mold in situ within a mold holder; melting some of said post metal so that the melted metal contacts the mold; and passing electrical current through the mold holder and mold, melted metal and post metal to further melt said metal, in order to form a post.

What is claimed is:

1. In an apparatus for use in burning the posts of a battery having a cover and a bushing in said cover through which a column of post metal protrudes, the improvement comprising:
   a mold surrounding the protruding column of post metal; said mold being made of a material having low thermal mass and high electrical and thermal resistance;
   a mold holder means for holding said mold in situ; and
   a source of electricity connected to said mold holder means to supply electricity thereto during burning of the posts.

2. The apparatus of claim 1 wherein mold is made of Meehanite cast iron.

3. The apparatus of claim 1 wherein the mold is made of titanium.

4. The apparatus of claim 3 wherein the titanium mold has a copper insert therein connected thereto by silver solder.

5. The apparatus of claim 1 wherein the mold is made of a material selected from the group consisting of: titanium; inconel; nickel; iron; aluminum; copper; and lead.

6. The apparatus of claim 1 wherein the electricity is in the form of AC current at approximately 7500 amperes.

7. The apparatus of claim 6 wherein the electricity is supplied at approximately 2.5 volts.

8. The apparatus of claim 1 wherein the mold has wall thickness in the range of approximately 0.2 to 0.02 inches.

9. The apparatus of claim 1 wherein the mold is cooled by a cooling means connected thereto.

10. The apparatus of claim 9 wherein the cooling means is connected to the mold holder means.

11. A method of forming battery posts on a battery having a cover and a bushing in said cover through which a column of post metal projects, comprising:
    placing a mold around said post metal; said mold being made of a material having a low thermal mass and a high electrical and thermal resistance;
    retaining said mold in situ within a mold holder;
    melting some of said post metal so that the melted metal contacts the mold; and
    passing electrical current through the mold holder and mold, melted metal and post metal to further melt said metal, in order to form a post.

12. A method of claim 11 comprising placing a magnet near the mold to pump the melting metal.

13. The method of claim 11 wherein the electric current is AC at approximately 7500 amperes.

14. The method of claim 11 wherein the electric current is supplied at approximately 2.5 volts.

15. The method of claim 11 wherein a magnetic force is applied to the melting metal.

* * * * *